(12) United States Patent  
Ryu

(10) Patent No.: US 7,711,399 B2  
(45) Date of Patent: May 4, 2010

(54) MOBILE COMMUNICATION TERMINAL

(75) Inventor: Seong-Hyun Ryu, Incheon (KR)

(73) Assignee: LG Electronic Inc., Seoul (KR)

( * ) Notice: Subject to any disclaimer, the term of this patent is extended or adjusted under 35 U.S.C. 154(b) by 771 days.

(21) Appl. No.: 11/529,098

(22) Filed: Sep. 27, 2006

(65) Prior Publication Data

US 2007/0072659 A1    Mar. 29, 2007

(30) Foreign Application Priority Data

Sep. 27, 2005    (KR) .................... 10-2005-0090166

(51) Int. Cl.  
*H04M 1/00* (2006.01)

(52) U.S. Cl. .................... 455/575.4; 455/575.3

(58) Field of Classification Search .............. 455/550.1, 455/575.1–575.4

See application file for complete search history.

(56) References Cited

U.S. PATENT DOCUMENTS

| 7,159,833 B2* | 1/2007 | Kato ................. 248/349.1 |
| 2005/0009582 A1* | 1/2005 | Vooi-Kia et al. ......... 455/575.4 |
| 2006/0025184 A1* | 2/2006 | Cho et al. ................ 455/575.4 |

FOREIGN PATENT DOCUMENTS

| EP | 1517520 | 9/2004 |
| EP | 1528761 | 10/2004 |

* cited by examiner

*Primary Examiner*—Nick Corsaro  
*Assistant Examiner*—Sarwat Chughtai  
(74) *Attorney, Agent, or Firm*—Lee, Hong, Degerman, Kang & Waimey

(57) ABSTRACT

A mobile communication terminal is provided that can be opened or closed when the mobile communication terminal is shaken in one direction. By simply shaking the mobile communication terminal held in hand to move a weight pendulum, a second body of the terminal can be opened and closed with respect to a first body for user convenience.

16 Claims, 13 Drawing Sheets

MOBILE COMMUNICATION TERMINAL

CROSS-REFERENCE TO RELATED APPLICATIONS

Pursuant to 35 U.S.C. §119(a), this application claims the benefit of earlier filing date and right of priority to Korean Application No. 10-2005-090166, filed Sep. 27, 2005, the contents of which are hereby incorporated by reference herein in their entirety.

FIELD OF THE INVENTION

The present invention relates to a mobile communication terminal and, more particularly, to a mobile communication terminal having an opening/closing auxiliary device that easily opens or closes the terminal.

DESCRIPTION OF THE RELATED ART

A mobile communication terminal, such as a mobile phone or a PDA, is a mobile electronic device that allows a user to wirelessly transmit, receive, read or process information while traveling. The development of information communication technologies and memory technologies allows mobile communication terminals to provide extended functions such as capturing still or moving images, reproducing or editing various multimedia files and providing TV broadcasting to users.

Mobile communication terminals are becoming light and slim so as to be easily carried by a user. Therefore, they need to be mechanically supported in implementing diverse functions within a device of small and limited size.

FIGS. 1 and 2 illustrate an example of a related art mobile communication terminal 1. As illustrated in FIG. 1, the related art mobile communication terminal 1 includes a first body 10 and a second body 20 connected to the first body such that the second body can be slidably opened and closed with respect to the first body.

A first keypad 11 having a plurality of key buttons is installed at a front surface of the first body 10 to allow a user to input information or issue a control command. On a front surface of the second body 20, there are formed a display 21 for displaying visual information and a second keypad 22 having a plurality of key buttons to allow the user to input information or issue a control command when the terminal is closed A slide module 30 is installed between the first 10 body and second 20 body to guide the second body as it is slidably opened and closed with respect to the first body. The slide module 30 includes a first slide member 31 fixed on the first body 10, a second slide member 32 fixed on the second body 20 and an elastic connection member 33 connecting the first and second slide members and providing elastic force when the second slide member moves with respect to the first slide member. Accordingly, as illustrated in FIG. 2, when a user applies force to the second body 20, the second body continues to slide in a direction that it has been moved according to an operation of the elastic connection member 33 and is opened with respect to the first body 10.

When opening and closing the related art mobile communication terminal 1, the user must use his or her other hand or the fingers on the hand in which the terminal is held in order to open the second body 20. If the user cannot use his or her other hand, for example, when the other hand is busy or if the user's finger is handicapped, the user is unable to easily open and close the terminal.

SUMMARY OF THE INVENTION

One object of the present invention is to provide a mobile communication terminal having two connected bodies which are opened and closed that allow a user to open or close the mobile communication terminal without using a finger directly.

In one aspect of the present invention, a mobile communication terminal is provided. The mobile terminal includes a first body, a second body connected with the first body such that it can be slidably moved with respect to the first body by a slide module and a weight pendulum adapted to be movable by a guide part formed at the second body such that the terminal may be opened or closed by applying force in a direction that the second body is in an opened or closed position with respect to the first body, the force applied by physically moving the terminal.

It is contemplated that the guide part is formed in a lengthwise direction on the second body and includes a step for preventing the weight pendulum from being released. It is further contemplated that the terminal further includes a stopper unit adapted to stop the weight pendulum such that the weight pendulum is maintained at its stopped position.

It is contemplated that the stopper unit includes a first magnet installed at a first end of the guide part and adapted to attach the weight pendulum by magnetic force when the second body is in the opened position and a second magnet installed at a second end of the guide part and adapted to attach the weight pendulum by magnetic force when the second body is in the closed position. It is further contemplated that the stopper unit includes a first stopper protrusion formed at a first end of the guide part and adapted to fix the weight pendulum when the second body is in the opened position, a second stopper protrusion formed at a second end of the guide part and adapted to fix the weight pendulum when the second body is in the closed position and a stopping recess formed on the weight pendulum and adapted to engage the first stopper protrusion when the first body is in the opened position and engage the second stopper protrusion when the second body is in the closed position.

It is contemplated that the first stopper protrusion and the second stopper protrusion are formed such that they protrude at the side of the guide part. It is further contemplated that the terminal further includes a first buffer formed at a first end of the guide part and a second buffer formed at a first end of the guide part such that an impact of the weight pendulum with the first end and the second end of the guide part is reduced. Preferably, the first buffer and second buffer are made of rubber or silicon.

In another aspect of the present invention, a mobile communication terminal is provided. The mobile terminal includes a first body, a second body connected to the first body such that it can be swingably moved with respect to the first body by a hinge module and a weight pendulum adapted to be movable by a guide part formed at the second body such that the terminal may be opened or closed by applying force in a direction that the second body is in an opened or closed position with respect to the first body, the force applied by physically moving the terminal.

It is contemplated that the guide part is formed in a circular arc with a certain length on the second body and further including a step formed at the side of the guide part to prevent the weight pendulum from being released from the guide part. It is further contemplated that the terminal further includes a stopper unit adapted to stop the weight pendulum such that the weight pendulum is maintained at its stopped position.

It is contemplated that the stopper unit includes a first magnet installed at a first end of the guide part and adapted to attach the weight pendulum by magnetic force when the second body is in the opened position and a second magnet installed at a second end of the guide part and adapted to attach the weight pendulum by magnetic force when the second body is in the closed position. It is further contemplated that the stopper unit includes a first stopper protrusion formed at a first end of the guide part and adapted to fix the weight pendulum when the second body is in the opened position, a second stopper protrusion formed at a second end of the guide part and adapted to fix the weight pendulum when the second body is in the closed position and a stopping recess formed on the weight pendulum and adapted to engage the first stopper protrusion when the first body is in the opened position and engage the second stopper protrusion when the second body is in the closed position.

It is contemplated that the first stopper protrusion and the second stopper protrusion are formed such that they protrude at the side of the guide part. It is further contemplated that the first stopper protrusion and the second stopper protrusion are supported such that they can be elastically protruded or retracted.

It is contemplated that the terminal further includes a first buffer formed at a first end of the guide part and a second buffer formed at a first end of the guide part such that an impact of the weight pendulum with the first end and the second end of the guide part is reduced. It is further contemplated that the first buffer and second buffer are made of rubber or silicon.

It is contemplated that a first end of the weight pendulum is pivoted and rotatably connected with the hinge module. It is further contemplated that a second end of the weight pendulum fixes is fixed to the guide part and the first end of the weight pendulum is connected to a pivot connection member pivoted at the hinge module.

In another aspect of the present invention, a mobile communication terminal is provided. The mobile terminal includes a first body, a second body connected with the first body such that it can be moved with respect to the first body and a weight pendulum adapted to be movable by a guide part formed at the second body such that the terminal may be opened or closed by applying force in a direction that the second body is in an opened or closed position with respect to the first body, the force applied by physically moving the terminal.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed. These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The exemplary embodiments of the present invention will now be described with reference to the accompanying drawings.

Figure 1:
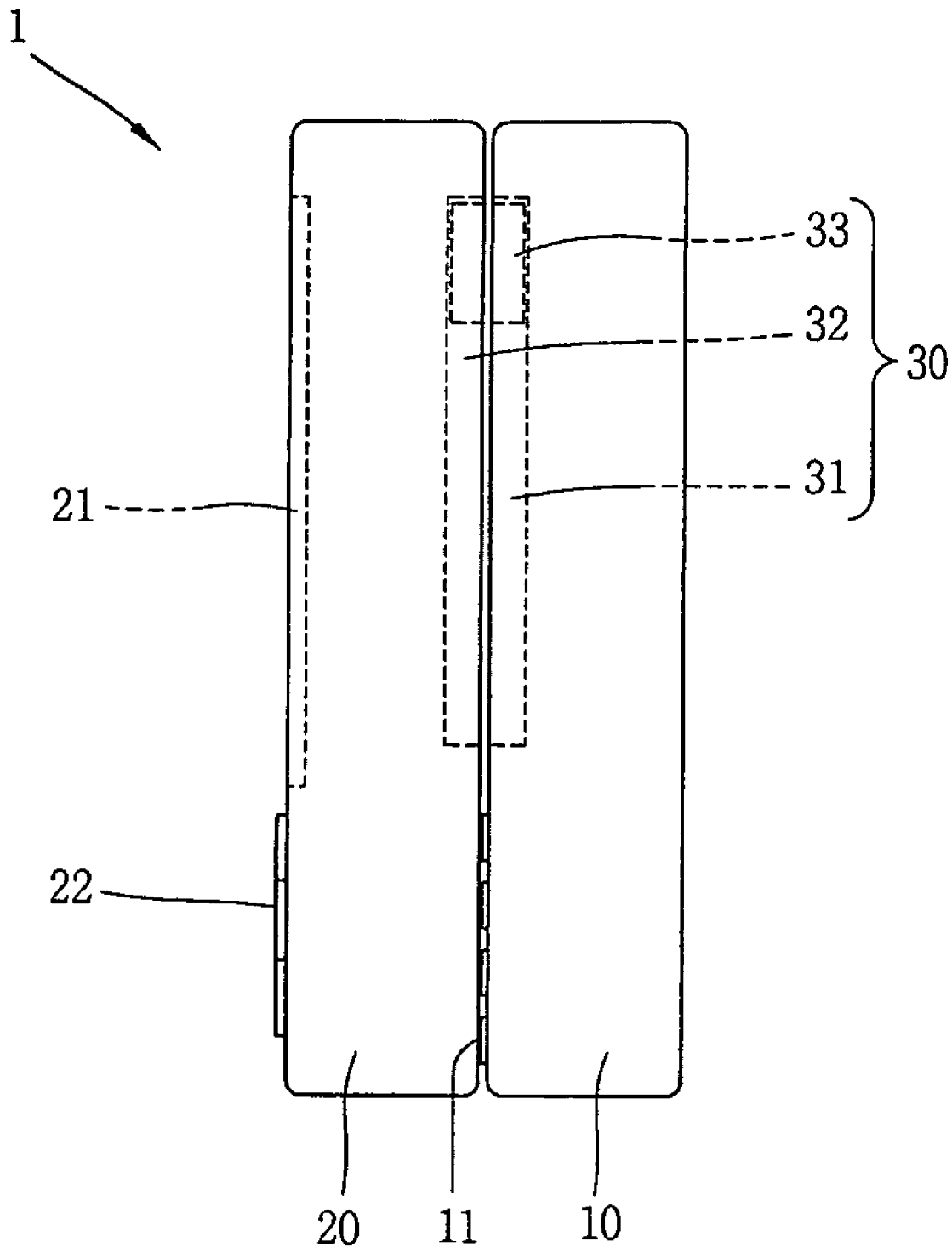
FIG. 1 illustrates a side view of a mobile communication terminal according to the related art.
Figure 2:
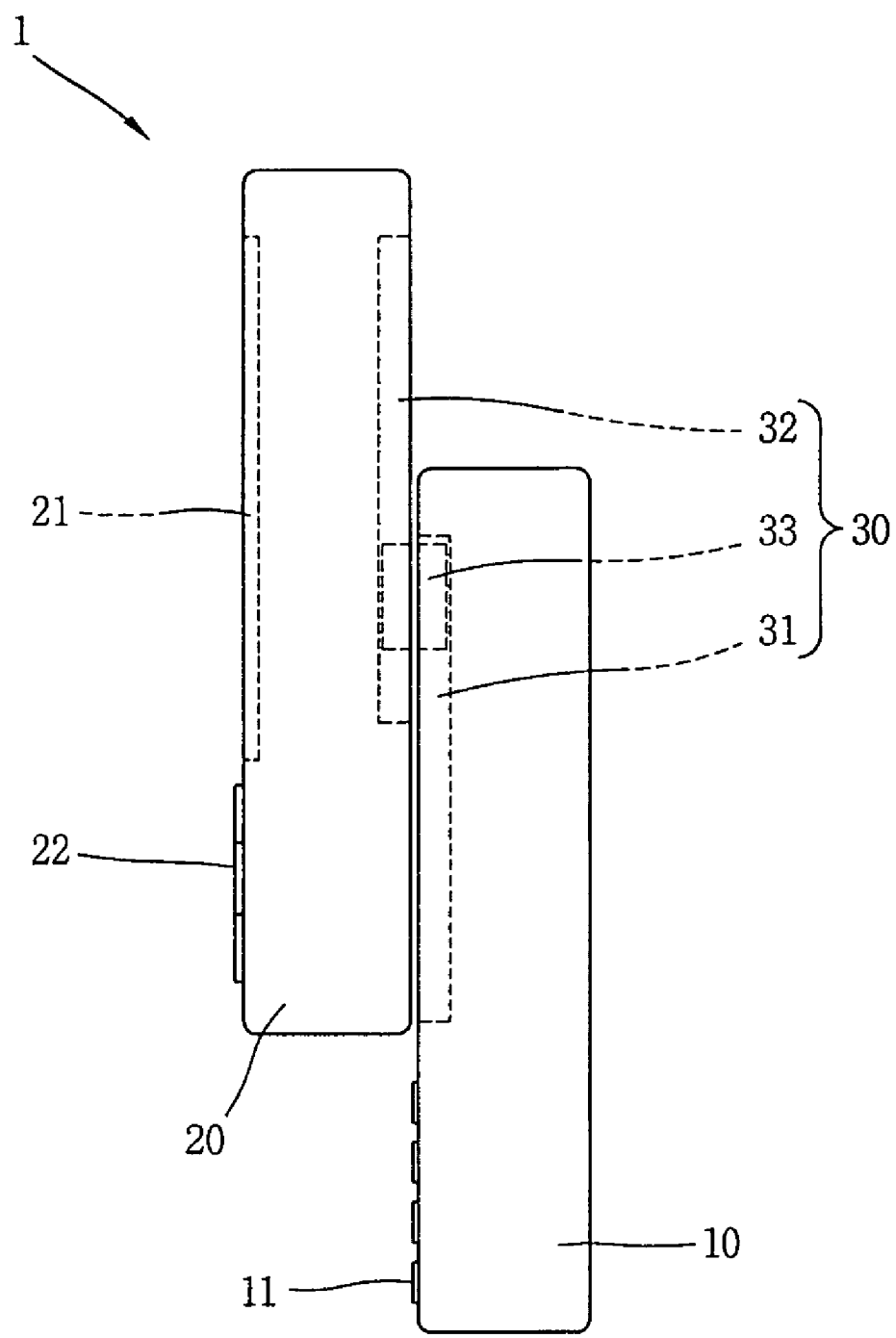
FIG. 2 illustrates a side view showing an opened state of the mobile communication terminal in FIG. 1.
Figure 3:
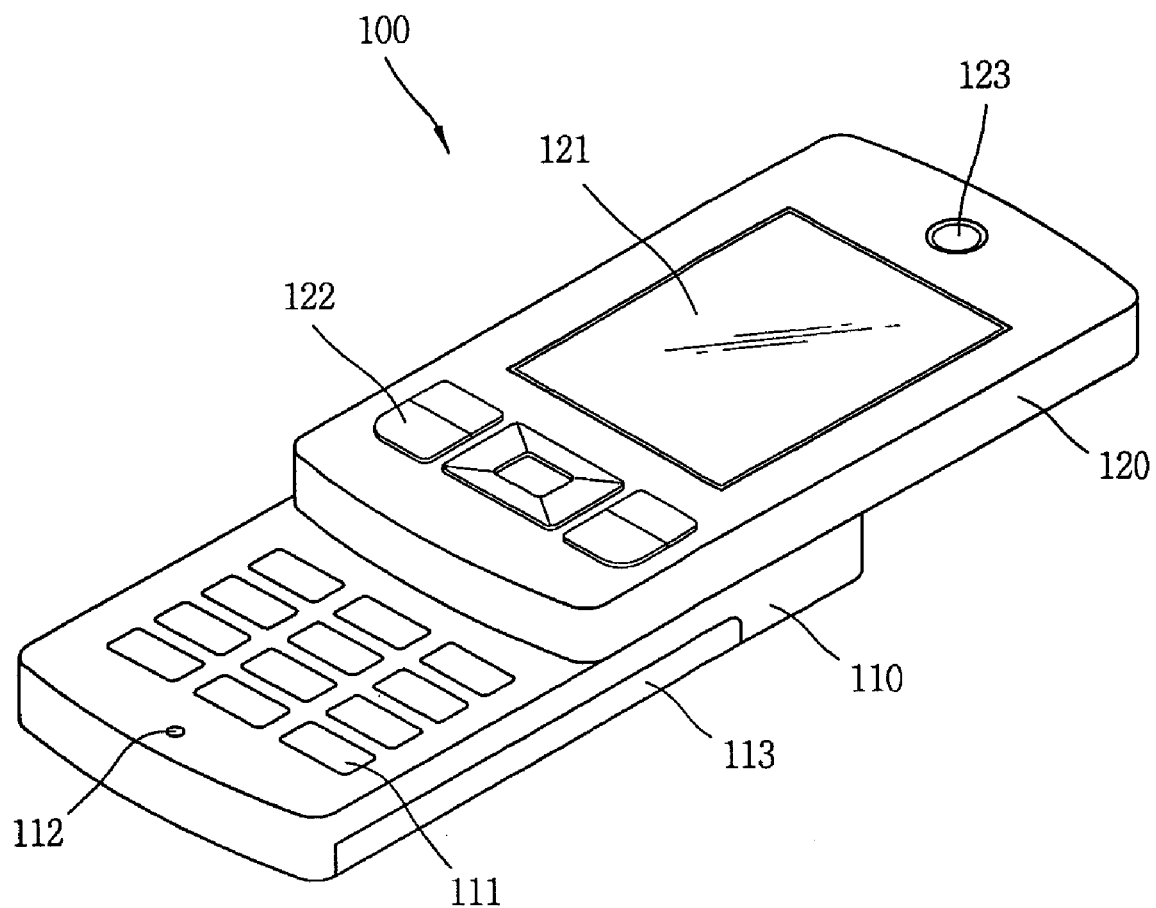
FIG. 3 illustrates a perspective view of a mobile communication terminal according to a first embodiment of the present invention.

FIG. 3 is a perspective view of a mobile communication terminal according to a first embodiment of the present invention. As illustrated in FIG. 3, the mobile communication terminal 100 includes a first body 110 and a second body 120 that is slidably moved in order to open and close the terminal.

On a front surface of the first body 110, there is a first keypad 111 having a plurality of key buttons to input information or issue a control command and a microphone 112 for receiving a voice signal. A second keypad 122 is provided on a front surface of the second body 120. On a rear surface of the first body 110, there is a battery 113 installed for supplying power to the mobile communication terminal 100. A display 121 for displaying visual information and a speaker 123 for outputting a voice signal are installed on a front surface of the second body 120. With such a structure, a user can slidably move the second body 120 to open with respect to the first body 110 in order to enter a call mode or input/output information through the first key pad 112 and second keypad 122.

Figure 4:
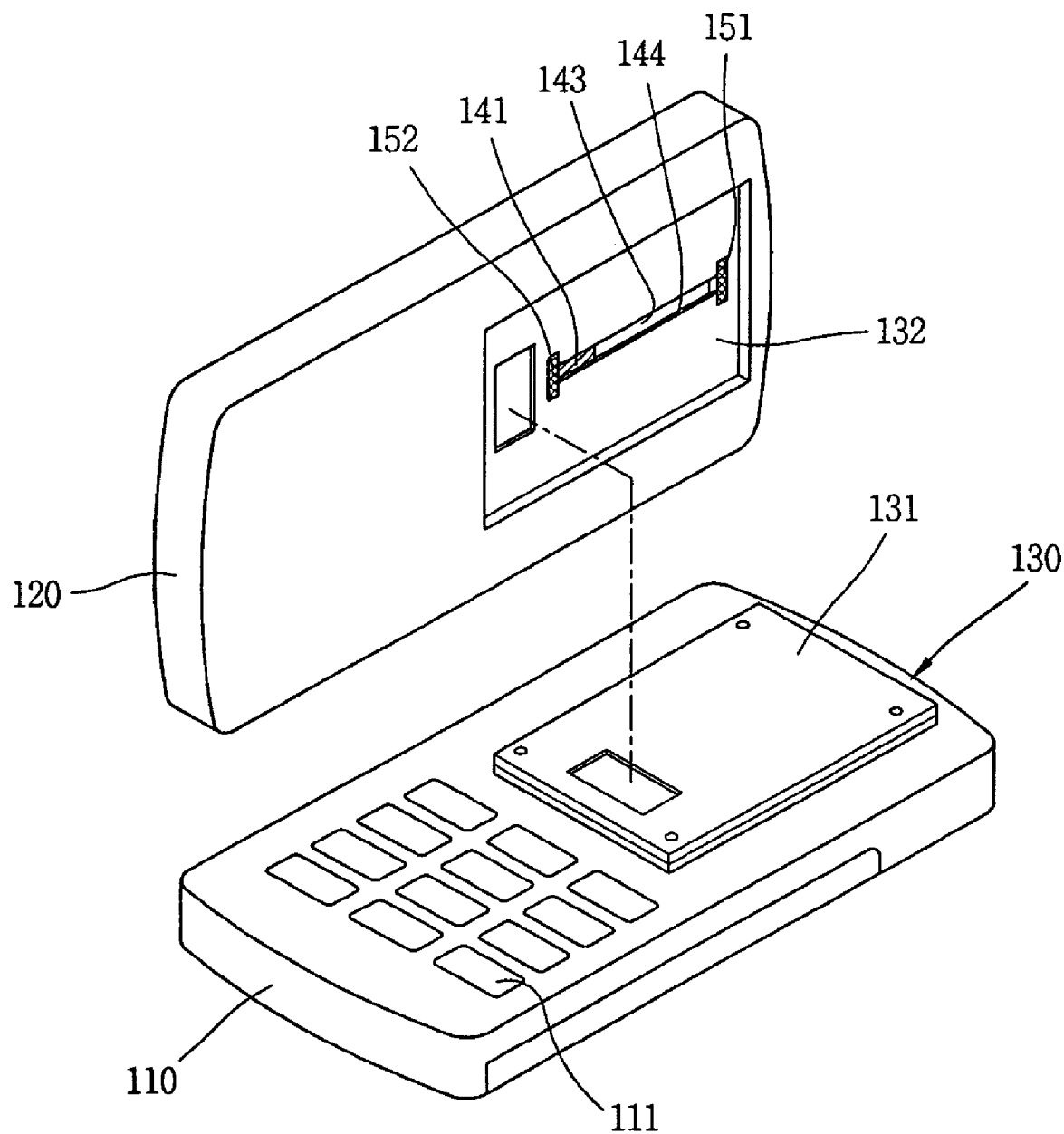
FIG. 4 illustrates a separated perspective view showing the second body separated from the first body of the mobile communication terminal in FIG. 3.

FIG. 4 illustrates a separated perspective view showing the second body 120 separated from the first body 110 of the mobile communication terminal 100 in FIG. 3. As illustrated in FIG. 4, a slide module 130 is installed between the first body 110 and second body 120 to allow the second body to slidably move to open and close in a lengthwise direction with respect to the first body. A weight pendulum 141 is installed to be linearly movable at the second body 120 so that when the terminal 100 is shaken in the lengthwise direction, the weight pendulum applies a force such that the second body is opened or closed.

A guide part 143 is formed in a lengthwise direction at the second body 120 to allow the weight pendulum 141 to move linearly. The guide part 143 has a step 144 at the side to prevent the weight pendulum 141 from being released.

Figure 5:
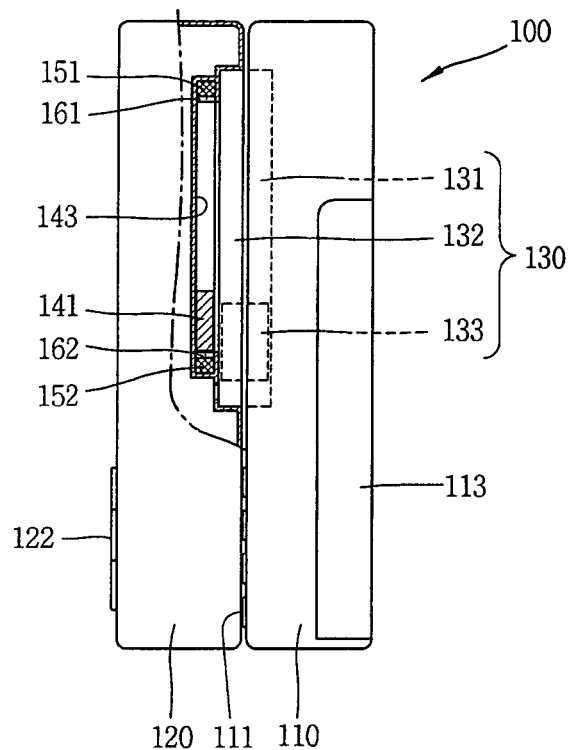
FIG. 5 is a partial side sectional view of the mobile communication terminal in FIG. 3.

FIG. 5 illustrated a partial side sectional view of the mobile communication terminal 100 in FIG. 3. As illustrates in FIG. 5, the slide module 130 includes a slide member 131 fixed at the first body 110, a second slide member 132 fixed at the second body 120 and an elastic connection member 133 connecting the first slide member to the second slide member and providing elastic force when the second slide member is moved with respect to the first slide member.

A stopper unit for stopping the weight pendulum 141 is provided at both the upper and lower ends of the guide part 143 so that the weight pendulum 141 can be maintained in a moved position. The stopper unit includes a first magnet 151 installed at an upper end of the guide part 143 to attach the weight pendulum by its magnetic force when the second body 120 is in an opened state and a second magnet 152 installed at a lower end of the guide part 143 to attach the weight pendulum by its magnetic force when the second body is in a closed state.

Preferably, the magnetic force of the first magnet 151 and second magnet 152 is strong enough to allow the weight pendulum 141 to move when the terminal 100 is shaken to open and close the second body 120. In order to lessen an impact generated when the weight pendulum 141 moves up and down along the guide part 143 toward the first magnet 151 and second magnet 152, first and second buffer members 161 and 162 are installed at the upper and lower ends of the guide part 143, respectively. Preferably, the buffer members 161 and 162 are made of rubber or silicon, and accordingly, noise caused by the impact with the weight pendulum 141 can be reduced.

Figure 6:
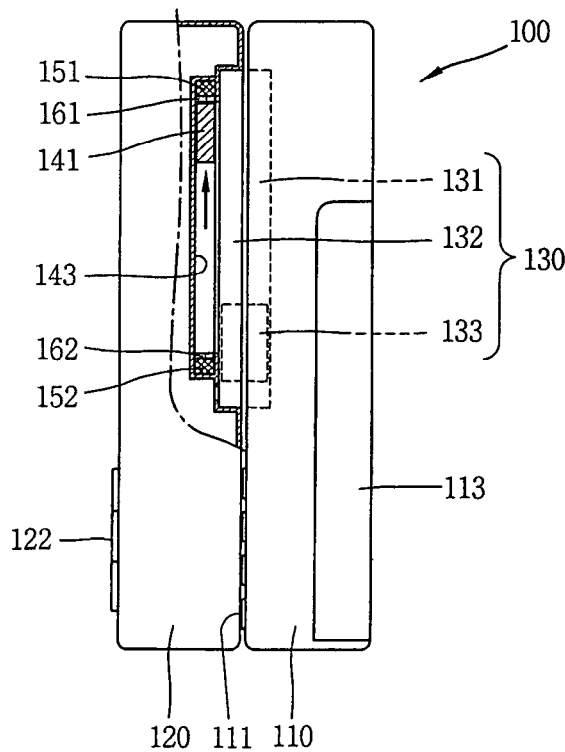
FIGS. 6 and 7 illustrate operational states of the mobile communication terminal in FIG. 3.
Figure 7:
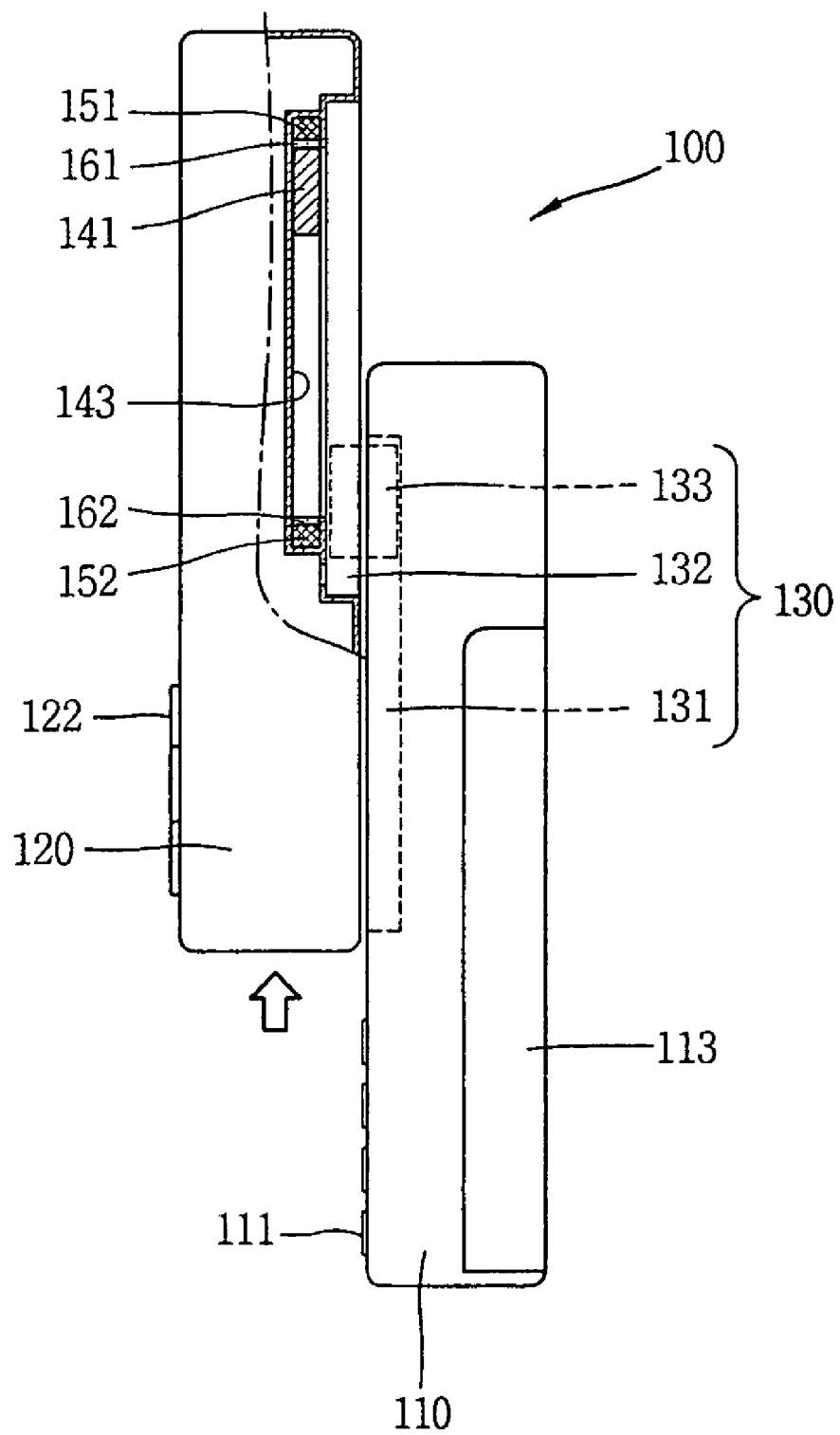

FIGS. 6 and 7 illustrate operational states of the mobile communication terminal 100 in FIG. 5. In the state illustrated in FIG. 5, the weight pendulum 141 is at the lower end of the guide part. When the mobile communication terminal 100 is shaken upward, the weight pendulum 141 at the lower end of the guide part 143 moves upward in the guide part as illustrated in FIG. 6. When the weight pendulum 141 contacts the buffer member 161 at the upper and of the guide part 143, the second body 120 moves to the open position due to inertia as illustrated in FIG. 7.

The upwardly moving weight pendulum 141 is stopped by the buffer member 161 when it reaches the upper end of the guide part 143 and the impact is transferred to the second body 120. Then, the second body 120 is moved upward due to the impact of the weight pendulum 141 and opened with respect to the first body 110 according to an operation of the slide module 130. The weight pendulum 141 is maintained at the position of the upper end of the guide part 143 according to the magnetic force of the first magnet 151.

Conversely, with the second body 120 opened as illustrated in FIG. 7, when the mobile communication terminal 100 is shaken downward, the weight pendulum 141 positioned at the upper end of the guide part 143 moves downward in the guide part. When the weight pendulum contacts the buffer member 162 at the lower end of the guide part 143, the second body 120 moves to closed position due to the inertia.

When the downwardly moving weight pendulum 141 reaches the lower end of the guide part 143, the buffer member 162 stops it and the corresponding impact is transferred to the second body 120. Then, the second body 120 is moved downward due to the impact of the weight pendulum 141 and the second body 120 is closed with respect to the first body 110 according to the operation of the slide module 130. The weight pendulum 141 is maintained at the upper end of the guide part 143 according to the magnetic force of the second magnet 152.

In this manner, the second body 120 can be opened or closed with respect to the first body 110 by simply shaking the mobile communication terminal 100.

Figure 8:
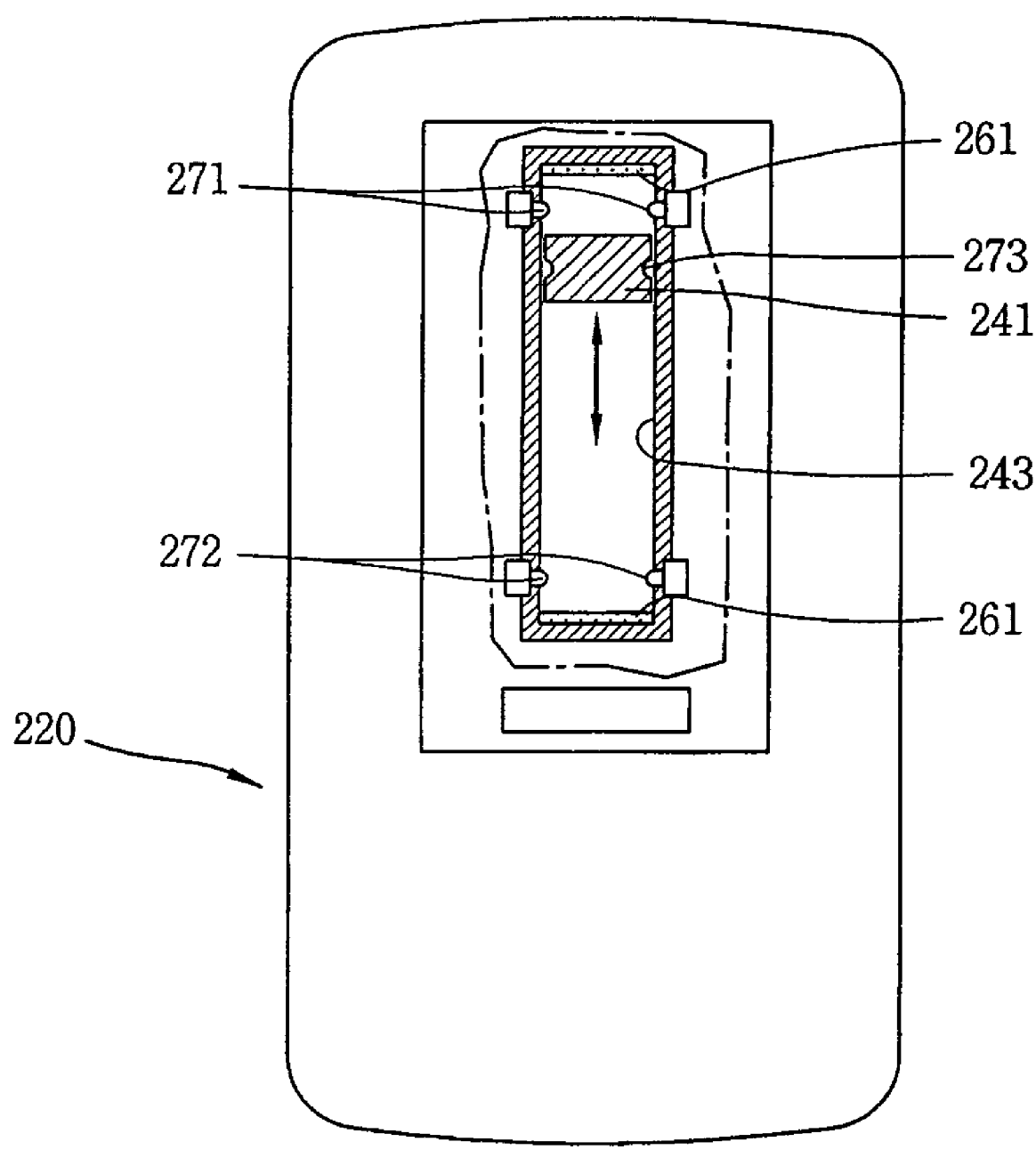
FIG. 8 illustrates a rear view showing a partial section of the second body of a second embodiment of the present invention.

FIG. 8 illustrates a rear view showing a partial section of the second body 220 according to a second embodiment of the present invention. In the second embodiment of the present invention, a stopper unit can maintain a weight pendulum 241 at a position at an upper end or a lower end of a guide part 243.

As illustrated in FIG. 8, the stopper unit includes a first stopper protrusion 271 formed at the upper end of the guide part 243 that fixes the weight pendulum 241 when the second body 220 is in an opened state, a second stopper protrusion 272 formed at the lower end of the guide part 243 that fixes the weight pendulum when the second body is in a closed state and a stopping recess 273 formed the weight pendulum that allows the first and second stopper protrusions to be engaged. The first stopper protrusion 271 and second stopper protrusion 272 are protrusively formed at the side of the guide part 243 and the stopping recess 273 is also formed at the corresponding side of the weight pendulum 241.

Preferably, the first stopped protrusion 271 and second stopper protrusion 272 are supported by the guide part 243 such that they can be protruded or retreated elastically with respect to the guide part 243. Accordingly, when the weight pendulum 241 moves to the upper end of the guide part 243, the stopping recess 273 is engaged by the first stopper protrusion 271 such that it is maintained in a position at the upper end of the guide part. Conversely, when the weight pendulum 241 moves to the lower end of the guide part 243, the stopping recess 273 is engaged by the second stopper protrusion 272 and maintained in a position at the lower end at the guide part.

Figure 9:
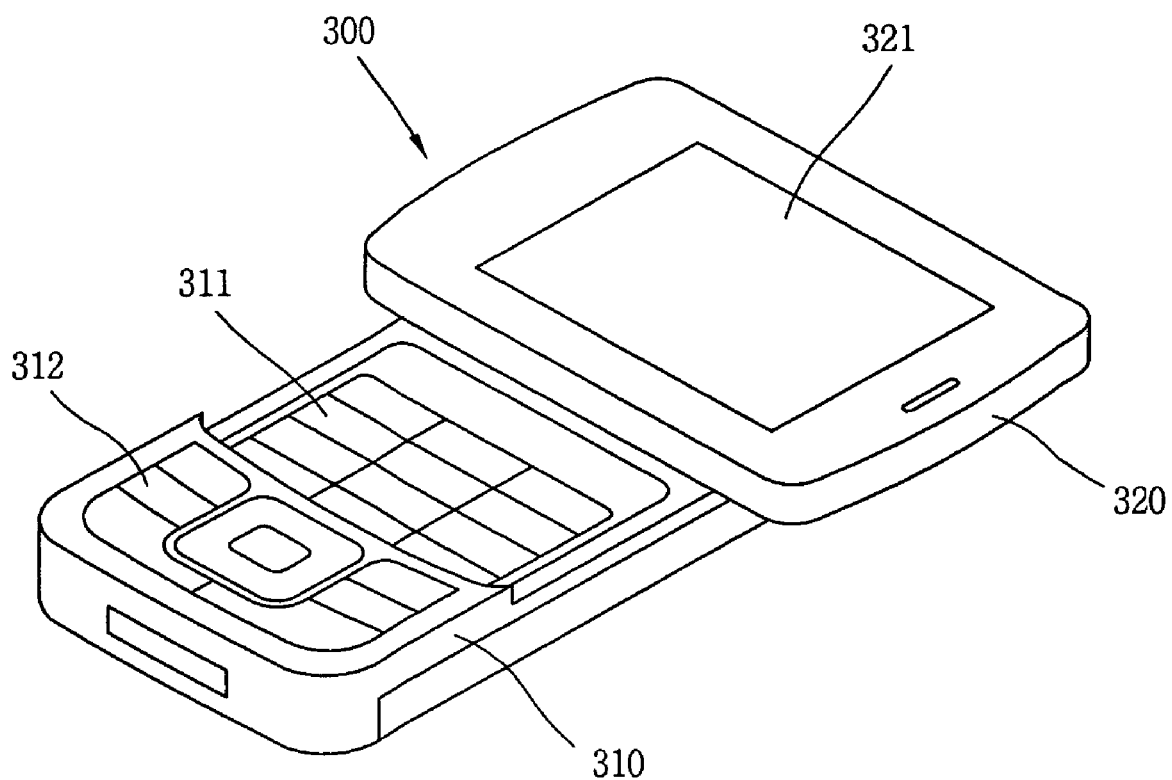
FIG. 9 illustrates a perspective view of a mobile communication terminal according to a third embodiment of the present invention.

FIG. 9 illustrates a perspective view of a mobile communication terminal 300 according to a third embodiment of the present invention. As illustrated in FIG. 9, the mobile communication terminal 300 includes a first body 310 and a second body 320 that is swingably connected with the first body.

A first keypad 311 having a plurality of key buttons for inputting information or issuing a control command is installed on a front surface of the first body 310 at a region opened or closed by the second body 320. A second keypad 312 for inputting information or issuing a control command without having to open the second body 320 is installed at one side of the first keypad. A display 321 for displaying visual information is installed on a front surface of the second body 320 and rotated together with the second body 320 as the second body is rotated.

Figure 10:
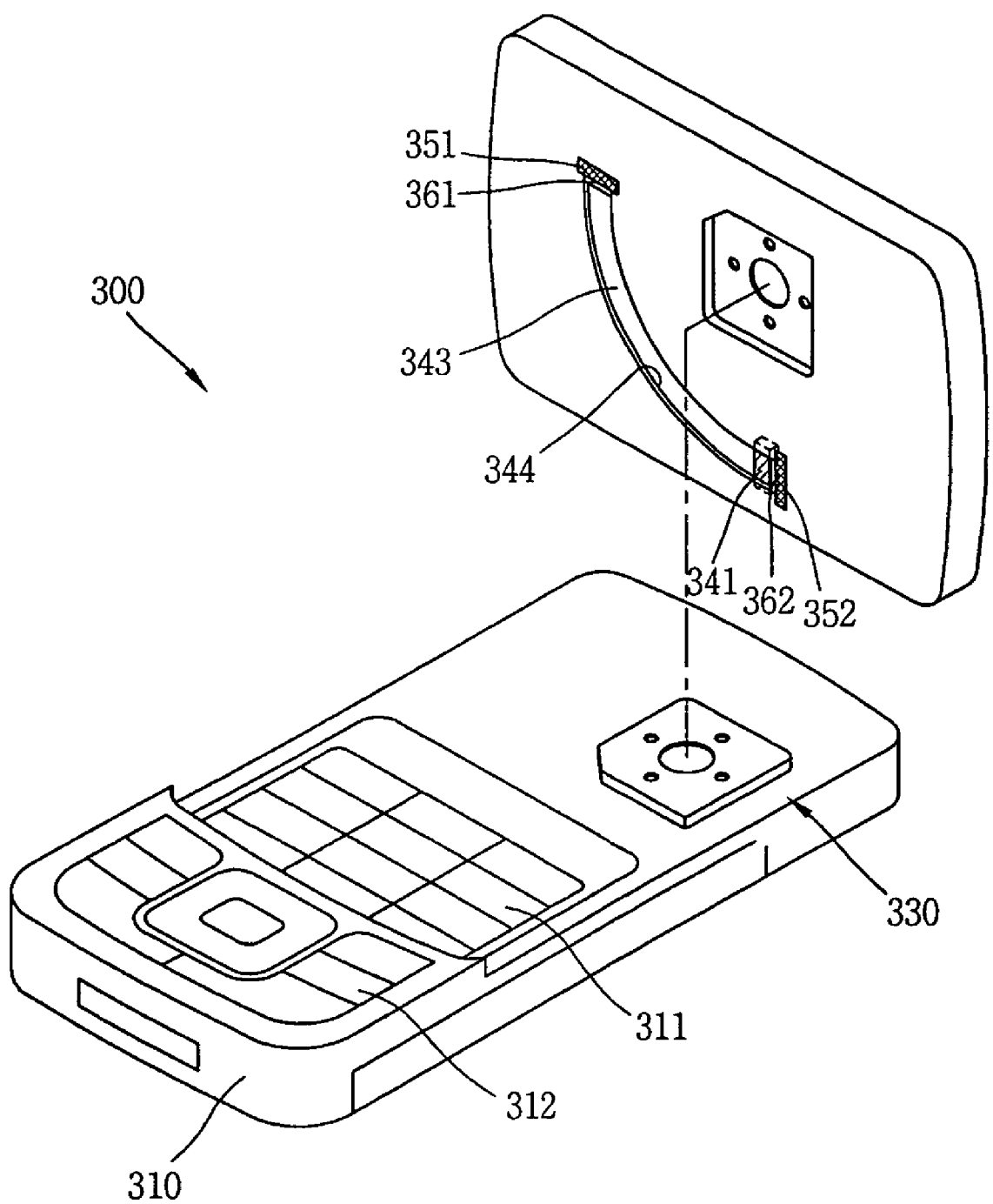
FIG. 10 illustrates a separated perspective view showing the second body separated from the first body of the mobile communication terminal in FIG. 9.

FIG. 10 illustrates a separated perspective view showing the second body 320 of the mobile communication terminal in FIG. 9 separated from the first body 310. As illustrated in FIG. 10, a hinge module 330 is installed between the first body 310 and second body 320 in order to swingably connect the second body to the first body.

A weight pendulum 341 is rotatably installed on a rear surface of the second body 320. When the terminal 300 is shaken in a widthwise direction, the weight pendulum 341 applies force in a direction that the second body 320 is opened, and when the terminal 300 is shaken in a lengthwise direction, the weight pendulum 341 applies force in a direction that the second body is closed.

A guide part 343 is formed in a circular arc on the rear surface of the second body 320 along which the weight pendulum 341 can be rotated to apply force to the second body.

The guide part 323 includes a step 344 formed at the side to prevent the weight pendulum 341 from being released.

A stopper unit is installed at both ends of the guide part 343 to stop the weight pendulum 341 so that the weight pendulum can be maintained at a moved position. The stopper unit includes a first magnet 351 installed at one end of the guide part 343 to attach the weight pendulum by its magnetic force when the second body 320 is in an opened state, and a second magnet 352 installed at an opposite end of the guide part 343 to attach the weight pendulum 341 by its magnetic force when the second body is in a closed state. First and second buffer members 361 and 362 are installed at the opposite ends, respectively, of the guide part 343 to lessen an impact when the weight pendulum 341 is stopped after being moved along the guide part 323 along the circular arc.

Figure 11:
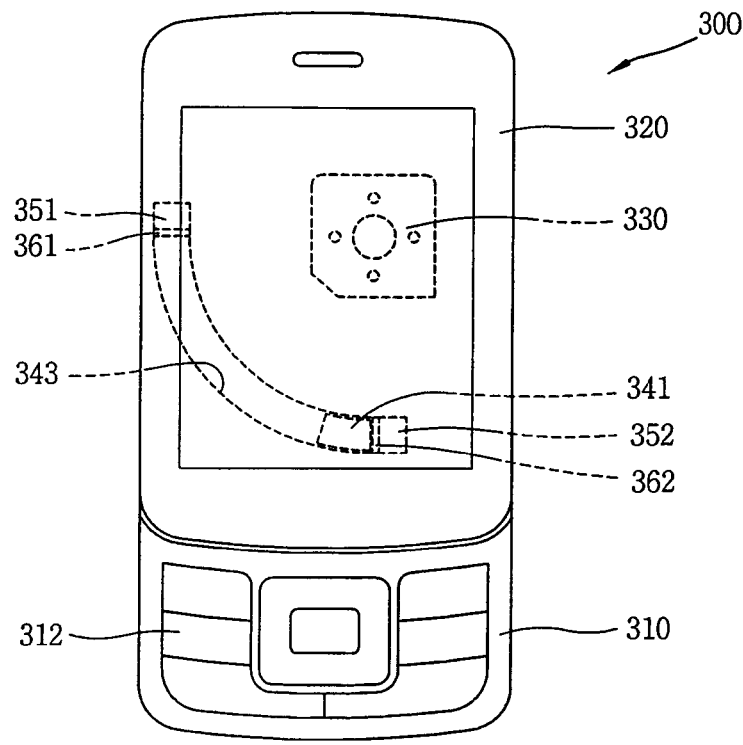
FIG. 11 illustrates a plan view of the mobile communication terminal in FIG. 9.
Figure 12:
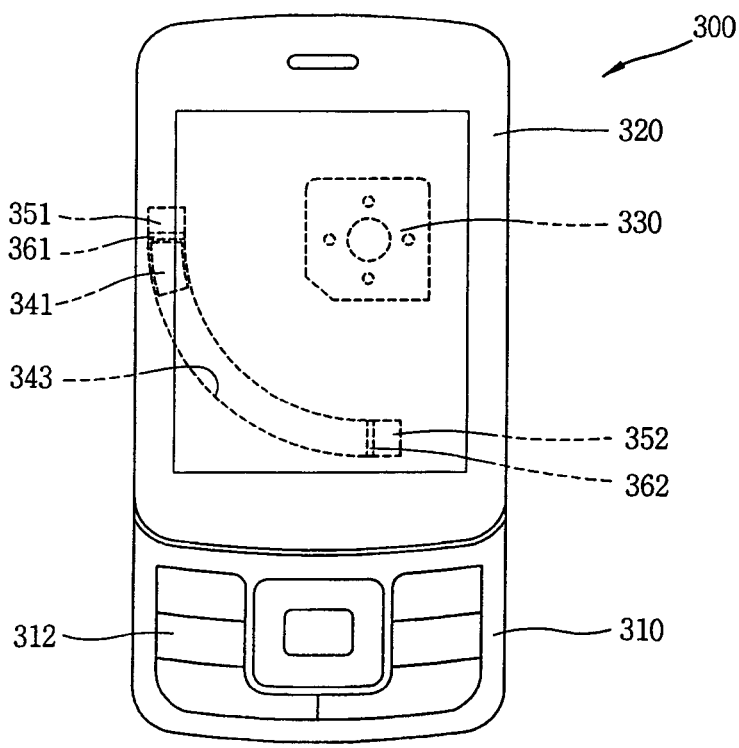
FIGS. 12 and 13 illustrate operational states of the mobile communication terminal in FIG. 9.
Figure 13:
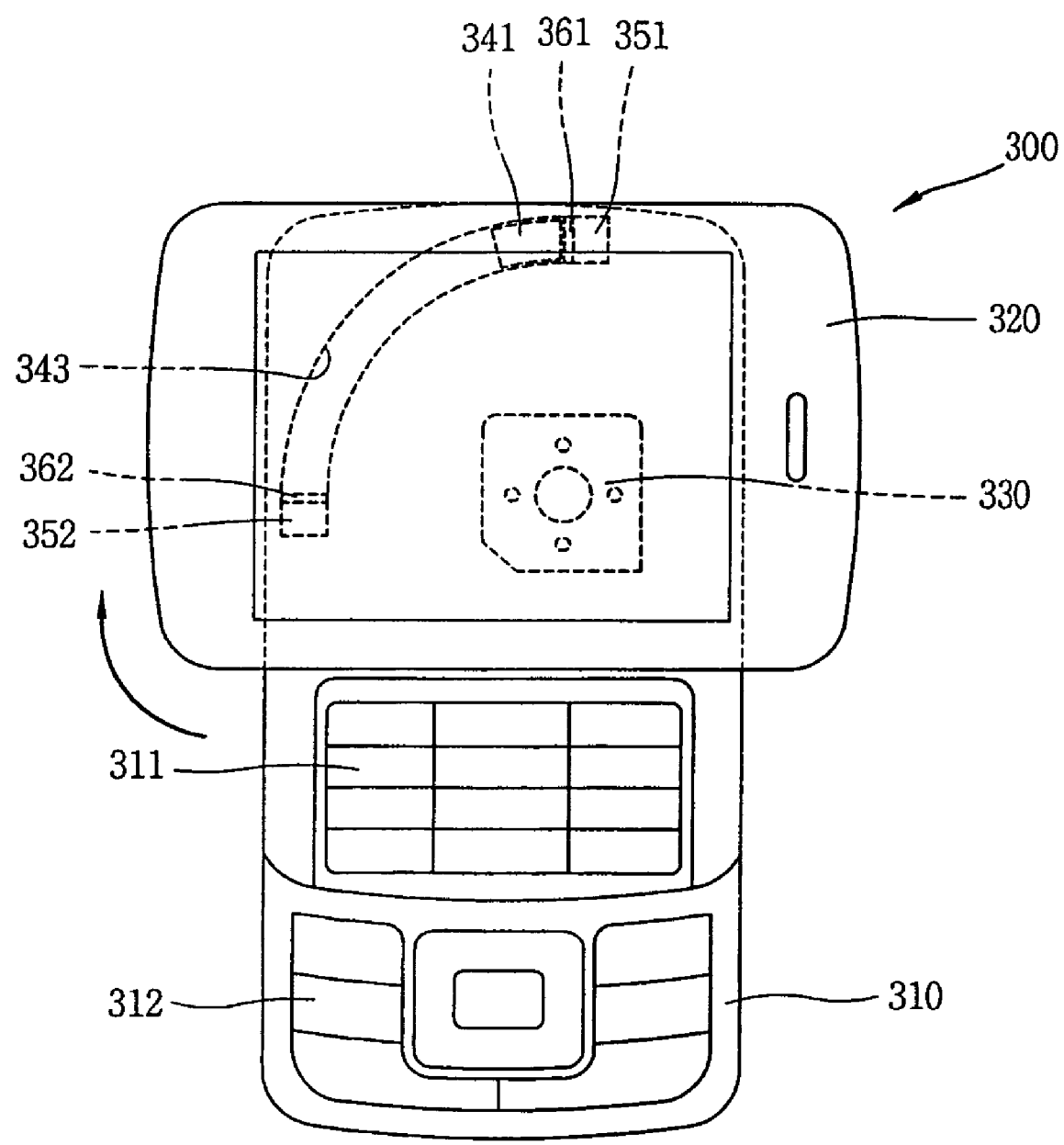

FIGS. 11 to 13 illustrate operational states of the mobile communication terminal in FIG. 9. In the state illustrated in FIG. 11, the mobile communication terminal 300 is in a closed state. When the mobile communication terminal 300 is shaken leftward, the weight pendulum 341 positioned at the lower end of the guide part 343 moves along the guide part toward the upper end. When the weight pendulum 141 contacts the first buffer member 361 as illustrated in FIG. 12, the second body 320 moves to the open position due to the inertia as illustrated in FIG. 13.

The weight pendulum 341 that has moved upward after being rotated is stopped when it reaches the first buffer member 361 at the upper end of the guide part 343, and the corresponding impact is transferred to the second body 320. Accordingly, the second body 320 is rotated due to the impact of the weight pendulum 341 and then opened with respect to the first body 310 according to an operation of the hinge module 330. The weight pendulum 341 is maintained at the position of the upper end of the guide part 343 by a magnetic force of the first magnet 351.

Conversely, with the second body 320 opened as illustrated in FIG. 13, when the mobile communication terminal 300 is shaken up and down, the weight pendulum 341 positioned at the upper end of the guide part 343 moves downward in the guide part. When the weight pendulum 341 contacts the second buffer member 362 at the lower end of the guide part 343, the second body 320 moves to the closed position due to the inertia.

The downwardly moving weigh pendulum 341 is stopped when it reaches second buffer member 362 at the lower end of the guide part 343, and the corresponding impact is transferred to the second body 320. Accordingly, the second body 320 is rotated rightward due to the impact of the weight pendulum 341 and the second body is closed with respect to the first body 310 according to the operation of the hinge module 330. The weight pendulum 341 is maintained at the position at the lower end of the guide part 343 by a magnetic force of the second magnet 352.

In this manner, the second body 320 can be opened or closed with respect to the first body 310 by simply shaking the mobile communication terminal 300.

Figure 14:
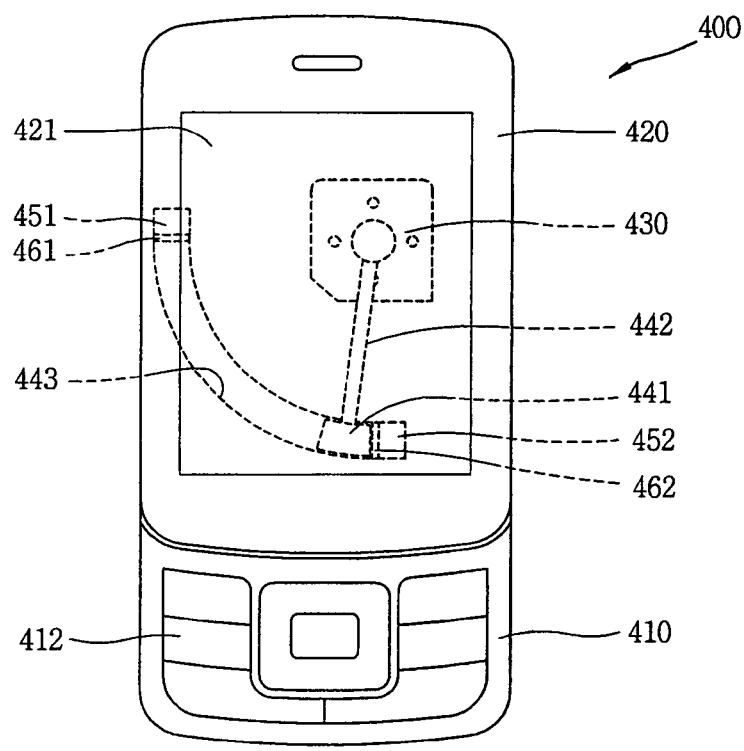
FIG. 14 illustrates a plan view of a mobile communication terminal according to a fourth embodiment of the present invention.

FIG. 14 illustrates a plan view of a mobile communication terminal 400 according to a fourth embodiment of the present invention. As illustrated in FIG. 14, the mobile communication terminal 400 includes a first body 410 and a second body 420 that is swingably connected with the first body.

A first keypad 411 (refer to FIG. 16) having a plurality of key buttons for inputting information or issuing a control command is installed on a front surface of the first body 410 at a region opened or closed by the second body 420. A second keypad 412 for inputting information or issuing a control command without having to open the second body 420 is installed at one side of the first keypad 411. A display 421 for displaying visual information is installed on a front surface of the second body 420 and rotated together with the second body as the second body 420 is rotated.

A hinge module 430 is installed between the first body 410 and second body 420 in order to swingably connect the second body to the first body. A weight pendulum 441 is rotatably installed at a rear surface of the second body 420. When the terminal 400 is shaken in a widthwise direction, the weight pendulum 441 applies force in a direction that the second body 420 is opened, and when the terminal 400 is shaken in a lengthwise direction, the weight pendulum 441 applies force in a direction that the second body is closed.

One end of the weight pendulum 441 is pivoted and rotatably connected the hinge module 430. Specifically, one end of the weight pendulum 441 fixes the weight pendulum to the hinge module 430 and the other end of the weight pendulum is connected to a pivot connection member 442 pivoted at the hinge module. A guide part 443 may be formed at a rear surface of the second body 420 to allow the weight pendulum 441 to be rotatably moved.

Figure 15:
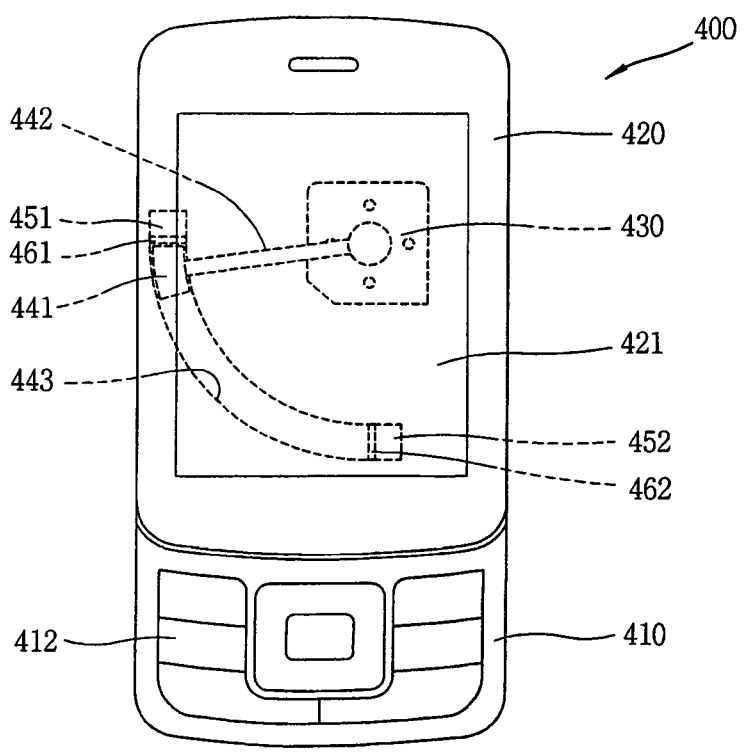
FIGS. 15 and 16 illustrate operational states of the mobile communication terminal in FIG. 14.
Figure 16:
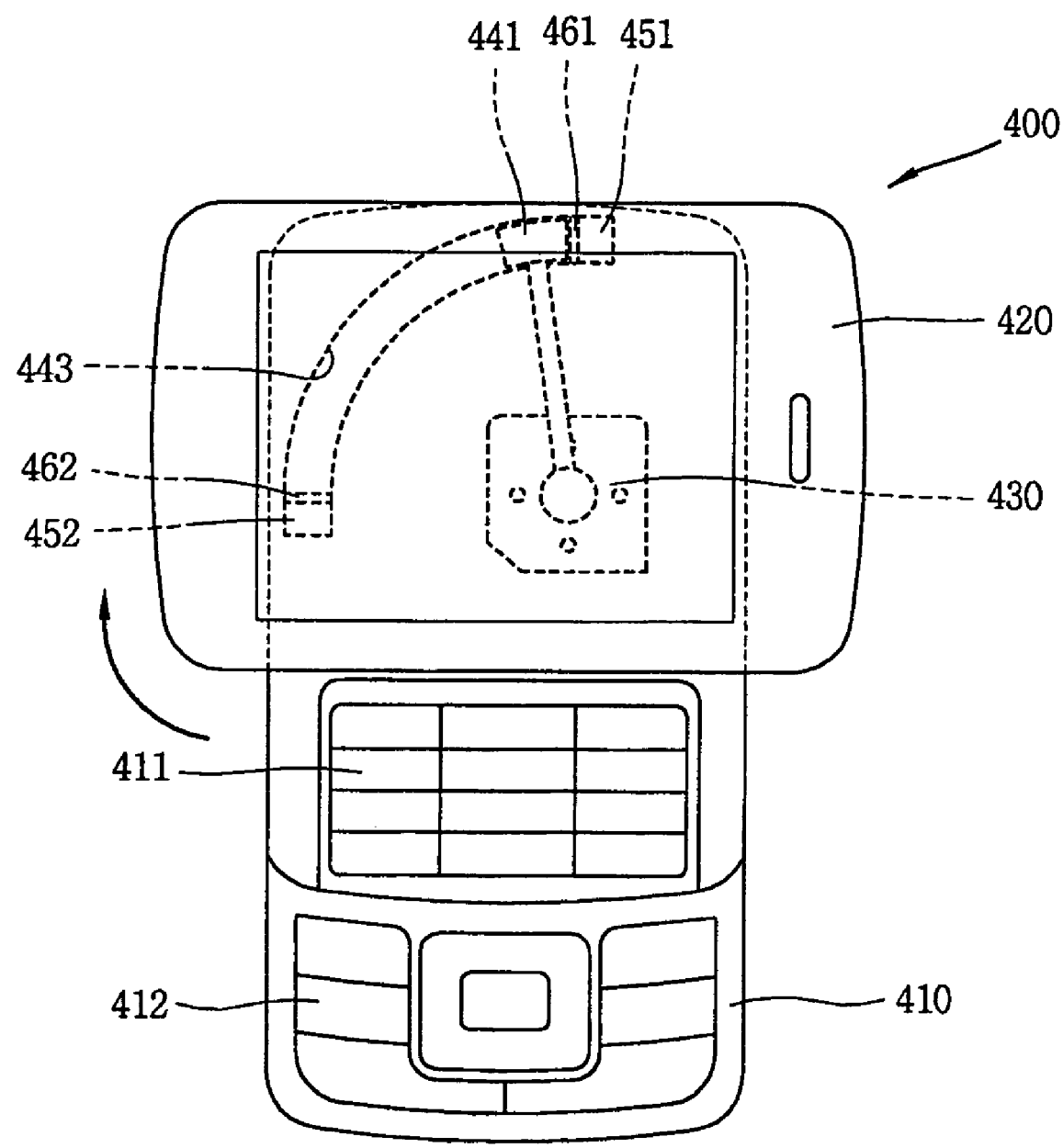

FIGS. 15 and 16 illustrate operational states of the mobile communication terminal in FIG. 14. In the closed state as illustrated in FIG. 14, the weight pendulum 441 is at the lower end of the guide part 443. When the mobile communication terminal 400 is shaken leftward, the weight pendulum 441 moves upward in the guide part 443. When the weight pendulum 441 contacts a buffer member 461 at the upper end of the guide part 430, the second body 420 is rotated leftward due to the inertia as shown in FIG. 15.

The rotated weight pendulum 441 is stopped when it reaches the buffer member 461 at the upper end of the guide part 443, and the corresponding impact is transferred to the second body 420. Accordingly, the second body 420 is rotated due to the impact of the weight pendulum 441 and opened with respect to the first body 410 according to the operation of the hinge module 430. The weight pendulum 441 is maintained at the position at the upper end of the guide part 443 by a magnetic force of a magnet 451.

Conversely, in the open state illustrated in FIG. 16, when the mobile communication terminal 400 is shaken downward, the weight pendulum 441 positioned at the upper end of the guide part 443 moves downward in the guide part. When the weight pendulum 441 contacts a buffer member 462 at the lower end of the guide part 443, the second body 420 rotated in the rightward direction due to the inertia.

The rotated weight pendulum 441 is stopped when it reaches the buffer member 462 at the lower end of the guide part 443, and the corresponding impact is transferred to the second body 420. Accordingly, the second body 420 is rotated rightward due to the impact of the weight pendulum 441 and closed with respect to the first body 410 according to the operation of the hinge module 430. The weight pendulum 441 is maintained at the position at the lower end of the guide part 443 by a magnetic force of a magnet 452.

In this manner, the second body 420 can be opened or closed with respect to the first body by simply shaking the mobile communication terminal 400.

As described, the mobile communication terminal according to the present invention has many advantages. For example, with the mobile communication terminal held, the second body can be opened or closed with respect to the first body by moving the weight pendulum by simply shaking the mobile communication terminal, so user convenience can be improved. Because the weight pendulum can be maintained in its moved state by the stopper, unintentional opening or closing of the mobile communication terminal can be prevented. Additionally, the weight pendulum is applicable regardless of whether the mobile communication terminal is a slide type or a swing type mobile communication terminal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile communication terminal comprising:
   a first body;
   a second body connected with the first body such that it can be slidably moved with respect to the first body by a slide module;
   a weight pendulum adapted to be movable by a guide part formed at the second body such that the terminal may be opened or closed by applying force in a direction that the second body is in an opened or closed position with respect to the first body, the force applied by physically moving the terminal;
   a stopper unit adapted to stop the weight pendulum such that the weight pendulum is maintained at its stopped position;
   a first magnet installed at a first end of the guide part and adapted to attach the weight pendulum by magnetic force when the second body is in the opened position; and
   a second magnet installed at a second end of the guide part and adapted to attach the weight pendulum by magnetic force when the second body is in the closed position.

2. The terminal of claim 1, wherein the guide part is formed in a lengthwise direction on the second body and comprises a step for preventing the weight pendulum from being released.

3. The terminal of claim 1, wherein the stopper unit comprises:
   a first stopper protrusion formed at a first end of the guide part and adapted to fix the weight pendulum when the second body is in the opened position;
   a second stopper protrusion formed at a second end of the guide part and adapted to fix the weight pendulum when the second body is in the closed position; and
   a stopping recess formed on the weight pendulum and adapted to engage the first stopper protrusion when the first body is in the opened position and engage the second stopper protrusion when the second body is in the closed position.

4. The terminal of claim 3, wherein the first stopper protrusion and the second stopper protrusion are formed such that they protrude at the side of the guide part.

5. The terminal of claim 1, further comprising:
   a first buffer formed at a first end of the guide part and a second buffer formed at a first end of the guide part such that an impact of the weight pendulum with the first end and the second end of the guide part is reduced.

6. The terminal of claim 5, wherein the first buffer and second buffer are made of rubber or silicon.

7. A mobile communication terminal comprising:
   a first body;
   a second body connected to the first body such that it can be swingably moved with respect to the first body by a hinge module;
   a weight pendulum adapted to be movable by a guide part formed at the second body such that the terminal may be opened or closed by applying force in a direction that the second body is in an opened or closed position with respect to the first body, the force applied by physically moving the terminal;
   a stopper unit adapted to stop the weight pendulum such that the weight pendulum is maintained at its stopped position;
   a first magnet installed at a first end of the guide part and adapted to attach the weight pendulum by magnetic force when the second body is in the opened position; and
   a second magnet installed at a second end of the guide part and adapted to attach the weight pendulum by magnetic force when the second body is in the closed position.

8. The terminal of claim 7, wherein the guide part is formed in a circular arc with a certain length on the second body and further comprising a step formed at the side of the guide part to prevent the weight pendulum from being released from the guide part.

9. The terminal of claim 7, wherein the stopper unit comprises:
   a first stopper protrusion formed at a first end of the guide part and adapted to fix the weight pendulum when the second body is in the opened position;
   a second stopper protrusion formed at a second end of the guide part and adapted to fix the weight pendulum when the second body is in the closed position; and
   a stopping recess formed on the weight pendulum and adapted to engage the first stopper protrusion when the first body is in the opened position and engage the second stopper protrusion when the second body is in the closed position.

10. The terminal of claim 9, wherein the first stopper protrusion and the second stopper protrusion are formed such that they protrude at the side of the guide part.

11. The terminal of claim 9, wherein the first stopper protrusion and the second stopper protrusion are supported such that they can be elastically protruded or retracted.

12. The terminal of claim 7, further comprising:
    a first buffer formed at a first end of the guide part and a second buffer formed at a first end of the guide part such that an impact of the weight pendulum with the first end and the second end of the guide part is reduced.

13. The terminal of claim 12, wherein the first buffer and second buffer are made of rubber or silicon.

14. The terminal of claim 7, wherein a first end of the weight pendulum is pivoted and rotatably connected with the hinge module.

15. The terminal of claim 14, wherein a second end of the weight pendulum fixes is fixed to the guide part and the first end of the weight pendulum is connected to a pivot connection member pivoted at the hinge module.

16. A mobile communication terminal comprising:

a first body;

a second body connected with the first body such that it can be moved with respect to the first body;

a weight pendulum adapted to be movable by a guide part formed at the second body such that the terminal may be opened or closed by applying force in a direction that the second body is in an opened or closed position with respect to the first body, the force applied by physically moving the terminal;

a stopper unit adapted to stop the weight pendulum such that the weight pendulum is maintained at its stopped position;

a first magnet installed at a first end of the guide part and adapted to attach the weight pendulum by magnetic force when the second body is in the opened position; and a second magnet installed at a second end of the guide part and adapted to attach the weight pendulum by magnetic force when the second body is in the closed position.

* * * * *